US 11,281,229 B2

(12) United States Patent
Cheng et al.

(10) Patent No.: US 11,281,229 B2
(45) Date of Patent: Mar. 22, 2022

(54) METHOD AND APPARATUS FOR OUTPUTTING OBSTACLE INFORMATION

(71) Applicant: Baidu Online Network Technology (Beijing) Co., Ltd., Beijing (CN)

(72) Inventors: Yiyuan Cheng, Beijing (CN); Yu Ma, Beijing (CN); Jun Wang, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 132 days.

(21) Appl. No.: 16/133,461

(22) Filed: Sep. 17, 2018

(65) Prior Publication Data
US 2019/0179332 A1 Jun. 13, 2019

(30) Foreign Application Priority Data
Dec. 8, 2017 (CN) .......................... 201711297810.8

(51) Int. Cl.
G05D 1/02 (2020.01)
G05D 1/00 (2006.01)
(Continued)

(52) U.S. Cl.
CPC ......... *G05D 1/0246* (2013.01); *G05D 1/0088* (2013.01); *G06K 9/00805* (2013.01);
(Continued)

(58) Field of Classification Search
None
See application file for complete search history.

(56) References Cited

U.S. PATENT DOCUMENTS

2006/0072818 A1* 4/2006 Herley ...................... G06T 7/12
382/173

FOREIGN PATENT DOCUMENTS

CN 105205866 A 12/2015
CN 106054900 A 10/2016
(Continued)

OTHER PUBLICATIONS

Andres Serna and et al. "Detection segmentation and classification of 3D urban objects using mathematical morphology and supervised learning", 2014, ISPRS Journal of Photogrammetry and Remote Sensing, pp. 1-29 (Year: 2014).*
(Continued)

*Primary Examiner* — Yuen Wong
*Assistant Examiner* — Hongye Liang
(74) *Attorney, Agent, or Firm* — Knobbe, Martens, Olson & Bear, LLP

(57) ABSTRACT

Embodiments of the present disclosure disclose a method and apparatus for outputting obstacle information. A specific embodiment of the method comprises: determining a candidate direction information set of a target obstacle point cloud; determining, for each piece of candidate direction information in the candidate direction information set, a target value of the target obstacle point cloud in a direction indicated by the candidate direction information based on the target obstacle point cloud and a smallest circumscribing rectangle of the target obstacle point cloud in the direction indicated by the candidate direction information; defining candidate direction information having a minimum target value in the candidate direction information set as direction information corresponding to the target obstacle cloud point; and outputting the direction information corresponding to the target obstacle cloud point, thereby improving the abundance of content of outputted obstacle information.

19 Claims, 6 Drawing Sheets

(51) Int. Cl.
G06T 7/246 (2017.01)
G06K 9/00 (2022.01)
G06K 9/32 (2006.01)

(52) U.S. Cl.
CPC ............ *G06K 9/3241* (2013.01); *G06T 7/248* (2017.01); *G05D 2201/0213* (2013.01); *G06K 9/00201* (2013.01); *G06T 2207/10028* (2013.01); *G06T 2207/30261* (2013.01)

(56) References Cited

FOREIGN PATENT DOCUMENTS

| CN | 106407947 A | 2/2017 |
| CN | 107301646 A | 10/2017 |

OTHER PUBLICATIONS

Alexander Barth, and et al, "Estimating the Driving State of Oncoming Vehicles From a Moving Platform Using Stereo", 2009, IEEE Transactions on Intelligent Transportation System, vol. 10, No. 4 pp. 560-571 (Year: 2009).*

Mingqiang Yang, "A survey of shape feature extraction techniques", 2008, Pattern Recognition techniques, technology and applications, Book edited by Peng-Yeng Yin, Vienna, Austria, pp. 43-87 (Year: 2008).*

Manuel Abellanas and et al, "Best Fitting Rectangles", 2004, Technical Report, Department of Computer Science, Fern Universitat Hagen, Germany, pp. 1-18 (Year: 2004).*

Bin, et al., "Dynamic Obstacle Detection and Tracking method Based on 3D LiDAR" Automobile Technology, 1000-3703(2017)08-0019-07, 9 pages.

* cited by examiner

METHOD AND APPARATUS FOR OUTPUTTING OBSTACLE INFORMATION

CROSS-REFERENCE TO RELATED APPLICATIONS

This application is related to and claims priority from Chinese Application No. 201711297810.8, filed on Dec. 8, 2017 and entitled "Method and Apparatus for Outputting Obstacle Information," the entire disclosure of which is hereby incorporated by reference.

TECHNICAL FIELD

The present disclosure relates to the field of autonomous vehicle technology, specifically to the field of obstacle detecting technology, and more specifically to a method and apparatus for outputting obstacle information.

BACKGROUND

An autonomous vehicle, also known as a "mobile wheeled robot," comprehensively analyzes and processes information of the vehicle and information of the external environment of the vehicle collected by various sensors (e.g., a camera and a lidar) using a driving control device equipped on the vehicle to achieve route planning and driving control. In order to achieve safe driving, it is necessary to detect obstacles in the external environment of the vehicle and generate related information regarding the obstacles to avoid the obstacle and plan driving routes.

In existing methods for detecting an obstacle, the type of the obstacle (e.g., a static obstacle type and a moving obstacle type) and/or the mass center of the obstacle are determined generally.

SUMMARY

Embodiments of the present disclosure present a method and apparatus for outputting obstacle information.

In a first aspect, an embodiment of the present disclosure provides a method for outputting obstacle information. The method includes: determining a candidate direction information set of a target obstacle point cloud; determining, for each piece of candidate direction information in the candidate direction information set, a target value of the target obstacle point cloud in a direction indicated by the candidate direction information based on the target obstacle point cloud and a smallest circumscribing rectangle of the target obstacle point cloud in the direction indicated by the candidate direction information; defining candidate direction information having a minimum target value in the candidate direction information set as direction information corresponding to the target obstacle cloud point; and outputting the direction information corresponding to the target obstacle cloud point.

In some embodiments, the determining a target value of the target obstacle point cloud in a direction indicated by the candidate direction information based on the target obstacle point cloud and a smallest circumscribing rectangle of the target obstacle point cloud in the direction indicated by the candidate direction information includes: performing following target value calculation: determining the smallest circumscribing rectangle of the target obstacle point cloud in the direction indicated by the candidate direction information; calculating an area and a width-to-length ratio of the determined smallest circumscribing rectangle; determining a symmetry point count in the determined smallest circumscribing rectangle of the target obstacle point cloud; and determining the target value of the target obstacle point cloud in the direction indicated by the candidate direction information based on the calculated area and width-to-length ratio and the determined symmetry point count, wherein the target value of the target obstacle point cloud in the direction indicated by the candidate direction information is positively correlated with the calculated area and width-to-length ratio, and is negatively correlated with the determined symmetry point count.

In some embodiments, the target obstacle point cloud is set with an associated obstacle type including a motor vehicle type or a non-motor vehicle type.

In some embodiments, the determining the target value of the target obstacle point cloud in the direction indicated by the candidate direction information based on the calculated area and width-to-length ratio and the determined symmetry point count includes: defining an average value of first distances of points in the target obstacle point cloud as a first distance average value, in response to determining the obstacle type of the target obstacle point cloud being the motor vehicle type, wherein the first distance of a point in the target obstacle point cloud is a minimum value of shortest distances from the point to four sides of the determined smallest circumscribing rectangle; and determining the target value of the target obstacle point cloud in the direction indicated by the candidate direction information based on the calculated area and width-to-length ratio, the determined symmetry point count, and the determined first distance average value, wherein the target value of the target obstacle point cloud in the direction indicated by the candidate direction information is positively correlated with the calculated area and width-to-length ratio, and the determined first distance average value, and is negatively correlated with the determined symmetry point count.

In some embodiments, the determining the target value of the target obstacle point cloud in the direction indicated by the candidate direction information based on the calculated area and width-to-length ratio and the determined symmetry point count further includes: defining an average value of second distances of points in the target obstacle point cloud as a second distance average value, in response to determining the obstacle type of the target obstacle point cloud being the non-motor vehicle type, wherein the second distance of a point in the target obstacle point cloud is a shortest distance from the point to a central axis line segment, and the central axis line segment is a geometric center line of the determined smallest circumscribing rectangle along the direction indicated by the candidate direction information; and determining the target value of the target obstacle point cloud in the direction indicated by the candidate direction information based on the calculated area and width-to-length ratio, the determined symmetry point count, and the determined second distance average value, wherein the target value of the target obstacle point cloud in the direction indicated by the candidate direction information is positively correlated with the calculated area and width-to-length ratio, and the determined second distance average value, and is negatively correlated with the determined symmetry point count.

In some embodiments, before the outputting the direction information corresponding to the target obstacle cloud point, the method further includes: defining the direction information corresponding to the target obstacle cloud point as target direction information; defining the smallest circumscribing rectangle of the target obstacle cloud point in the direction indicated by the target direction information as a target circumscribing rectangle; and the outputting the direction information corresponding to the target obstacle cloud point includes: outputting the target direction information and at least one of: geometric center coordinates, a length or a width of the target circumscribing rectangle.

In some embodiments, before the outputting the target direction information and at least one of: geometric center coordinates, a length or a width of the target circumscribing rectangle, the method further includes: determining a confidence level of the target direction information based on the target obstacle cloud point and the target circumscribing rectangle; and the outputting the target direction information and at least one of: geometric center coordinates, a length or a width of the target circumscribing rectangle includes: outputting the target direction information and at least one of: the geometric center coordinates, the length or the width of the target circumscribing rectangle, or the determined confidence level.

In some embodiments, the determining a confidence level of the target direction information based on the target obstacle cloud point and the target circumscribing rectangle includes: determining a smallest circumscribing cuboid of the target obstacle point cloud based on the target circumscribing rectangle, in response to determining the obstacle type of the target obstacle point cloud being the motor vehicle type; defining an average value of third distances of points in the target obstacle point cloud as a third distance average value, wherein the third distance of a point in the target obstacle point cloud is a minimum value of shortest distances from the point to six sides of the smallest circumscribing cuboid; and determining the confidence level of the target direction information based on the third distance average value, wherein the determined confidence level is negatively correlated with the third distance average value.

In some embodiments, the determining a confidence level of the target direction information based on the target obstacle cloud point and the target circumscribing rectangle further includes: defining an average value of fourth distances of points in the target obstacle point cloud as a fourth distance average value, in response to determining the obstacle type of the target obstacle point cloud being a non-motor vehicle type, wherein the fourth distance of a point in the target obstacle point cloud is a shortest distance from the point to a geometric center line of the target circumscribing rectangle along the direction indicated by the target direction information; and determining the confidence level of the target direction information based on the fourth distance average value, wherein the determined confidence level is negatively correlated with the fourth distance average value.

In a second aspect, an embodiment of the present disclosure provides an apparatus for outputting obstacle information. The apparatus includes: a first determining unit, configured for determining a candidate direction information set of a target obstacle point cloud; a calculating unit, configured for determining, for each piece of candidate direction information in the candidate direction information set, a target value of the target obstacle point cloud in a direction indicated by the candidate direction information based on the target obstacle point cloud and a smallest circumscribing rectangle of the target obstacle point cloud in the direction indicated by the candidate direction information; a second determining unit, configured for defining candidate direction information having a minimum target value in the candidate direction information set as direction information corresponding to the target obstacle cloud point; and an outputting unit, configured for outputting the direction information corresponding to the target obstacle cloud point.

In some embodiments, the calculating unit is further used for: performing following target value calculation: determining the smallest circumscribing rectangle of the target obstacle point cloud in the direction indicated by the candidate direction information; calculating an area and a width-to-length ratio of the determined smallest circumscribing rectangle; determining a symmetry point count in the determined smallest circumscribing rectangle of the target obstacle point cloud; and determining the target value of the target obstacle point cloud in the direction indicated by the candidate direction information based on the calculated area and width-to-length ratio and the determined symmetry point count, wherein the target value of the target obstacle point cloud in the direction indicated by the candidate direction information is positively correlated with the calculated area and width-to-length ratio, and is negatively correlated with the determined symmetry point count.

In some embodiments, the target obstacle point cloud is set with an associated obstacle type including a motor vehicle type or a non-motor vehicle type.

In some embodiments, the determining the target value of the target obstacle point cloud in the direction indicated by the candidate direction information based on the calculated area and width-to-length ratio and the determined symmetry point count includes: defining an average value of first distances of points in the target obstacle point cloud as a first distance average value, in response to determining the obstacle type of the target obstacle point cloud being the motor vehicle type, wherein the first distance of a point in the target obstacle point cloud is a minimum value of shortest distances from the point to four sides of the determined smallest circumscribing rectangle; and determining the target value of the target obstacle point cloud in the direction indicated by the candidate direction information based on the calculated area and width-to-length ratio, the determined symmetry point count, and the determined first distance average value, wherein the target value of the target obstacle point cloud in the direction indicated by the candidate direction information is positively correlated with the calculated area and width-to-length ratio, and the determined first distance average value, and is negatively correlated with the determined symmetry point count.

In some embodiments, the determining the target value of the target obstacle point cloud in the direction indicated by the candidate direction information based on the calculated area and width-to-length ratio and the determined symmetry point count further includes: defining an average value of second distances of points in the target obstacle point cloud as a second distance average value, in response to determining the obstacle type of the target obstacle point cloud being the non-motor vehicle type, wherein the second distance of a point in the target obstacle point cloud is a shortest distance from the point to a central axis line segment, and the central axis line segment is a geometric center line of the determined smallest circumscribing rectangle along the direction indicated by the candidate direction information; and determining the target value of the target obstacle point cloud in the direction indicated by the candidate direction information based on the calculated area and width-to-length ratio, the determined symmetry point count, and the determined second distance average value, wherein the target value of the target obstacle point cloud in the direction indicated by the candidate direction information is positively correlated with the calculated area and width-to-length ratio, and the determined second distance average value, and is negatively correlated with the determined symmetry point count.

In some embodiments, the apparatus further includes: a third determining unit, configured for defining the direction information corresponding to the target obstacle cloud point as target direction information; a fourth determining unit, configured for defining the smallest circumscribing rectangle of the target obstacle cloud point in the direction indicated by the target direction information as a target circumscribing rectangle; and the outputting unit is further used for: outputting the target direction information and at least one of: geometric center coordinates, a length or a width of the target circumscribing rectangle.

In some embodiments, the apparatus further includes: a fifth determining unit, configured for determining a confidence level of the target direction information based on the target obstacle cloud point and the target circumscribing rectangle; and the outputting unit is further used for: outputting the target direction information and at least one of: the geometric center coordinates, the length or the width of the target circumscribing rectangle, or the determined confidence level.

In some embodiments, the fifth determining unit is further used for: determining a smallest circumscribing cuboid of the target obstacle point cloud based on the target circumscribing rectangle, in response to determining the obstacle type of the target obstacle point cloud being the motor vehicle type; defining an average value of third distances of points in the target obstacle point cloud as a third distance average value, wherein the third distance of a point in the target obstacle point cloud is a minimum value of shortest distances from the point to six sides of the smallest circumscribing cuboid; and determining the confidence level of the target direction information based on the third distance average value, wherein the determined confidence level is negatively correlated with the third distance average value.

In some embodiments, the fifth determining unit is further used for: defining an average value of fourth distances of points in the target obstacle point cloud as a fourth distance average value, in response to determining the obstacle type of the target obstacle point cloud being the non-motor vehicle type, wherein the fourth distance of a point in the target obstacle point cloud is a shortest distance from the point to a geometric center line of the target circumscribing rectangle along the direction indicated by the target direction information; and determining the confidence level of the target direction information based on the fourth distance average value, wherein the determined confidence level is negatively correlated with the fourth distance average value.

In a third aspect, an embodiment of the present disclosure provides an electronic device, the electronic device including: one or more processors; and a memory for storing one or more programs, where the one or more programs, when executed by the one or more processors, cause the one or more processors to implement the method according to any one of the implementations in the first aspect.

In a fourth aspect, an embodiment of the present disclosure provides a computer readable storage medium storing a computer program therein, where the computer program implements, when executed by a processor, the method according to any one of the implementations in the first aspect.

The method and apparatus for outputting obstacle information provided by an embodiment of the present disclosure calculate a target value of each piece of candidate direction information in a candidate direction information set of a target obstacle point cloud, define candidate direction information having a minimum target value in the candidate direction information set as direction information corresponding to the target obstacle cloud point, and finally output the direction information corresponding to the target obstacle cloud point, thereby improving the abundance of content of outputted obstacle information.

BRIEF DESCRIPTION OF THE DRAWINGS

By reading and referring to detailed description on the non-limiting embodiments in the following accompanying drawings, other features, objects and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
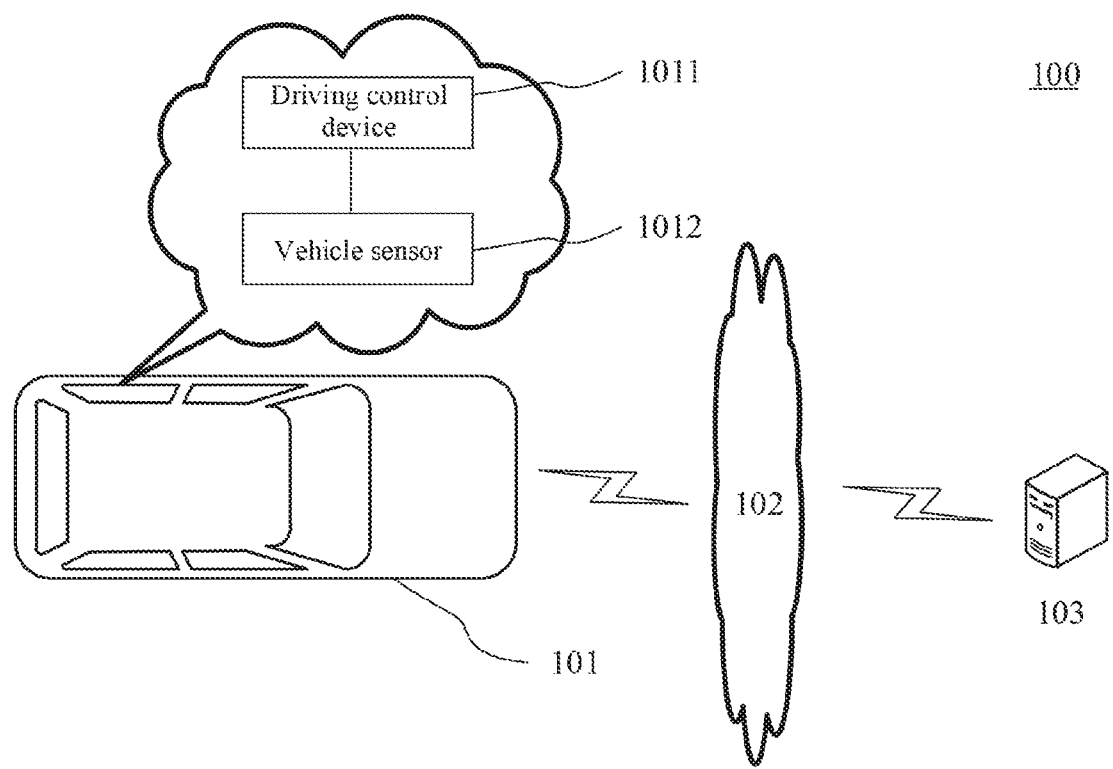
FIG. 1 is an architectural diagram of a system in which some embodiments of the present disclosure may be implemented.

FIG. 1 shows a system architecture 100 in which an embodiment of a method for outputting obstacle information or an apparatus for outputting obstacle information according to the present disclosure may be applied.

As shown in FIG. 1, the system architecture 100 may include a vehicle 101, a network 102 and a server cloud 103. The vehicle 101 may be provided with a driving control device 1011 and a vehicle sensor 1012. Here, the vehicle 101 may be an autonomous vehicle running in an autonomous driving mode or a manual driving mode.

When the vehicle 101 operates in the autonomous driving mode, the driving control device (also known as a vehicle controller) 1011 is responsible for intelligent control of the vehicle 101.

When the vehicle 101 operates in the manual driving mode, the driving control device 1011 in the vehicle 101 may provide supplementary information for driving.

The driving control device 1011 may be a separate controller, such as a programmable logic controller (PLC), a single chip micyoco or an industrial control machine. The driving control device 1011 may also be a device having an input/output port and including an electronic component with a computing control function. The driving control device 1011 may also be a computer device in which a vehicle driving control application is installed.

The driving control device 1011 may be connected with the server 103 through the network 102. The network 102 may include various connection types, such as a wired communication link, a wireless communication link, or a fiber cable.

The vehicle sensor 1012 may collect the external environment data and vehicle state data when the vehicle is traveling. As an example, the vehicle sensor 1012 may include a vehicle camera, a lidar sensor, a millimeter wave radar sensor, a collision sensor, a speed sensor, or an air pressure sensor. It should be noted that, a Global Navigation Satellite System (GLASS) device, or a Strap-down Inertial Navigation System (SINS) may be further installed in the vehicle 101 in practice.

The cloud server 103 may establish a connection with the driving control device 1011 through the network 102. The driving control device 1011 may send data associated with the vehicle 101 (e.g., various kinds of data collected by the vehicle sensor 1012 or data obtained by processing and analyzing the various kinds of data collected by the vehicle sensor 1012 by the driving control device 1011) to the cloud server 103. The cloud server 103 may analyze and process the data received from the driving control device 1011, and then feed back the processing result to the driving control device 1011. The driving control device 1011 may respond based on the received processing result.

It should be noted that the method for outputting obstacle information provided by an embodiment of the present disclosure may be executed by the driving control device 1011 or the cloud server 103. Accordingly, the apparatus for outputting obstacle information may be set in the driving control device 1011 or the cloud server 103.

It should be appreciated that the numbers of the vehicles, the vehicle sensors, the driving control devices, the networks and the cloud servers in FIG. 1 are only illustrative. Any number of the vehicles, the vehicle sensors, the driving control devices, the networks and the cloud servers may be provided based on implementation needs.

Figure 2:
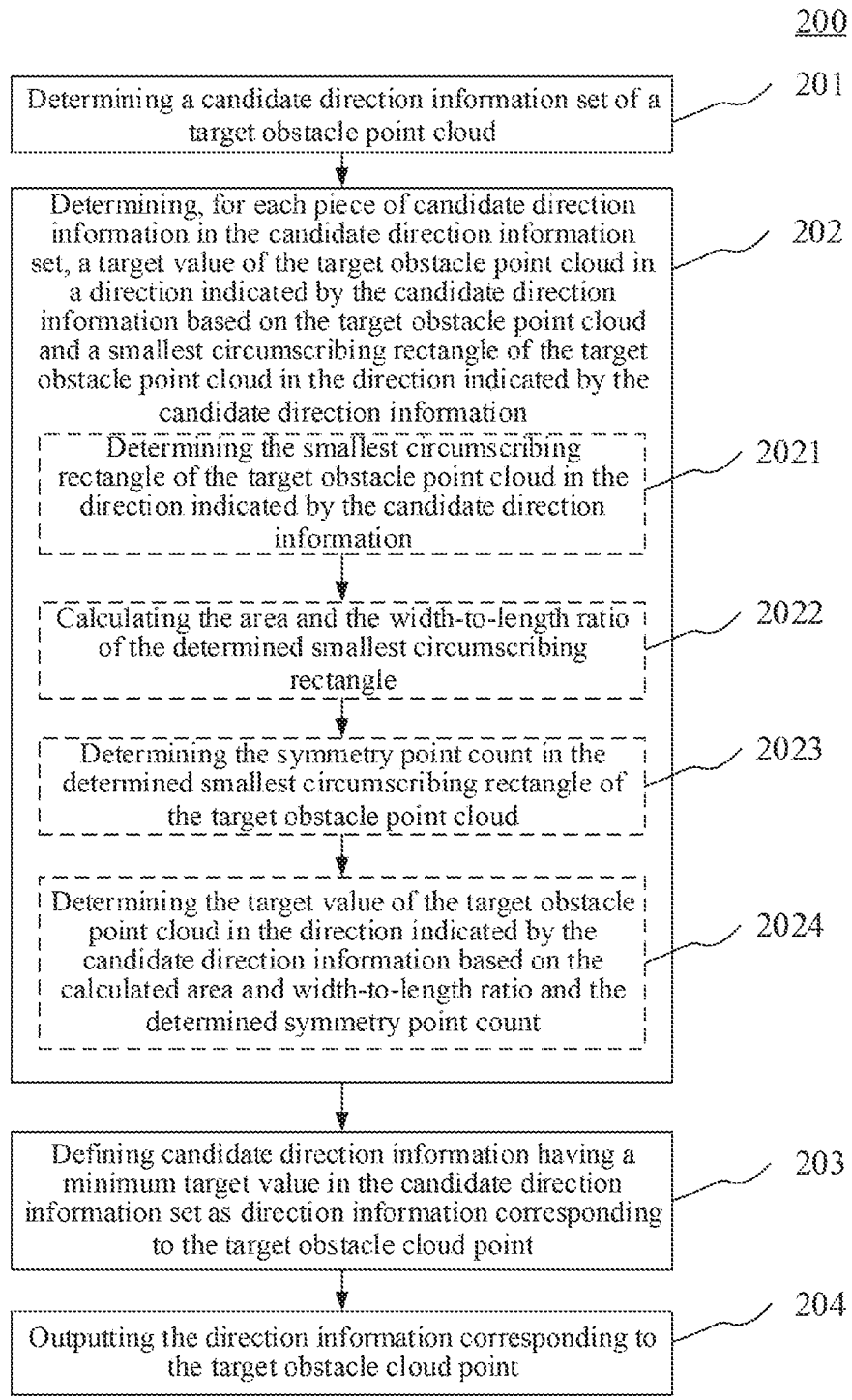
FIG. 2 is a flowchart of an embodiment of a method for outputting obstacle information according to the present disclosure.

Please further refer to FIG. 2, FIG. 2 shows a flow 200 of an embodiment of a method for outputting obstacle information according to the present disclosure. The method for outputting obstacle information includes the following steps.

Step 201: determining a candidate direction information set of a target obstacle point cloud.

When the autonomous vehicle is traveling, the various vehicle sensors (e.g., a lidar, a camera or a millimeter wave radar) installed on the autonomous vehicle may collect information of the external environment in real time, generate three dimensional (3D) point cloud data and send the 3D point cloud data to an electronic device (for example, the driving control device or the cloud server shown in FIG. 1) in which the method for generating obstacle motion information is performed. The electronic device may analyze and process the received various kinds of sensor data to identify and track an obstacle in the external environment of the vehicle, and predict the driving route of the obstacle for route planning and driving control of the vehicle.

To this end, first, before performing the step 201, the 3D point cloud data acquired from the vehicle sensors may be integrated to make the 3D point cloud data more complete. Then, a 3D point cloud may be divided into a plurality of obstacle point clouds using a point cloud clustering method, where each obstacle point cloud is a point cloud characterizing an obstacle. Next, the electronic device may classify and identify each obstacle point cloud, to identify the type of each obstacle point cloud. For example, the types of obstacle point clouds may include: a motor vehicle, a non-motor vehicle, a pedestrian, a tree, or a building. Then, each obstacle point cloud may also be denoised, including height limit, edge smoothing, or point cloud distribution consistency.

In order to track an obstacle for route planning when an autonomous vehicle is traveling, it is necessary to analyze various kinds of information associated with the obstacle based on the obstacle point cloud. It may be appreciated that in the embodiment, when obstacle information is outputted to track the obstacle and solve the route planning problem, obstacle information of a moving obstacle may be only selected and outputted, that is, the target obstacle point cloud may be an obstacle point cloud characterizing a moving obstacle. Here, the target obstacle point cloud may be a specified obstacle in a plurality of obstacle point clouds processed by the electronic device.

In the embodiment, the electronic device (e.g., the driving control device or the cloud server shown in FIG. 1) in which a method for outputting obstacle information is performed may first acquire a target obstacle point cloud. Then a candidate direction information set of the target obstacle point cloud is determined.

Here, the candidate direction information of the target obstacle point cloud is used for characterizing a possible driving direction of a target obstacle. For example, the direction information may be: "east-west direction", "north-south direction", "southeastern direction", "northeastern direction", "southwestern direction" or "northwestern direction." The direction information may also be coordinates of a point A and coordinates of a point B in a world coordinate system, i.e., the direction indicated by the direction information here may be a direction in parallel with a line segment formed by the point A and the point B.

In some optional implementations of the embodiment, the step 201 may be implemented as follows.

First, a set of two-dimensional (2D) plane coordinates corresponding to the target obstacle point cloud is determined. That is, only plane coordinates of each piece of 3D point data in the target obstacle point cloud are acquired, while height coordinates are not recorded.

Then, a convex hull of the determined set of 2D plane coordinates is generated. It should be noted that the method for generating a convex hull based on a set of 2D point coordinates is a widely researched and used existing technology, and is not repeatedly described any more here.

Next, the direction information formed by coordinates of two endpoints of each side of the generated convex hull is used as a candidate direction information set.

In some optional implementations of the embodiment, the step 201 may also be implemented as follows.

In a plane coordinate system in the world coordinate system, at least one line segment is obtained by traversal using a line segment formed by a 2D coordinate point P1 and a 2D coordinate point P2 as a reference line segment, based on a preset angle increment (for example, 1° or 10°) in 360° of the angle between the obtained line segment and the reference line segment. Then the direction information of directions of line segments of the obtained at least one line segment may be used as a candidate direction information set.

Step 202: determining, for each piece of candidate direction information in the candidate direction information set, a target value of the target obstacle point cloud in a direction indicated by the candidate direction information based on the target obstacle point cloud and a smallest circumscribing rectangle of the target obstacle point cloud in the direction indicated by the candidate direction information.

In the embodiment, the electronic device may first determine, for each piece of candidate direction information in the candidate direction information set determined in the step 201, a smallest circumscribing rectangle of the target obstacle point cloud in the direction indicated by the candidate direction information. Here, the direction of a long side of the determined smallest circumscribing rectangle of the target obstacle point cloud in the direction indicated by the candidate direction information is identical to the direction indicated by the candidate direction information. Here, the determining the smallest circumscribing rectangle may be determining coordinates of the four vertexes of the smallest circumscribing rectangle.

Figure 3A:
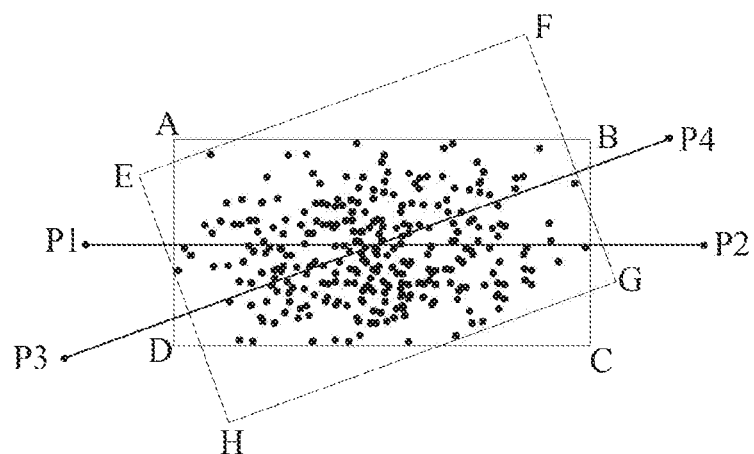
FIG. 3A is a schematic diagram of two smallest circumscribing rectangles of a target obstacle point cloud in directions indicated by two different pieces of candidate direction information according to some embodiments of the present disclosure.

As an example, FIG. 3A shows two smallest circumscribing rectangles. The direction of a long side AB of a rectangle ABCD is identical to the direction indicated by candidate direction information "point P1-point P2". The direction of a long side EF of a rectangle EFGH is identical to the direction indicated by candidate direction information "point P3-point P4".

Then, the target value of the target obstacle point cloud in the direction indicated by the candidate direction information may be determined using various implementations based on the target obstacle point cloud and the determined smallest circumscribing rectangle.

As an example, the electronic device may define the area of the determined smallest circumscribing rectangle as the target value of the target obstacle point cloud in the direction indicated by the candidate direction information.

As an example, the electronic device may also define the width-to-length ratio of the determined smallest circumscribing rectangle as the target value of the target obstacle point cloud in the direction indicated by the candidate direction information.

As an example, the electronic device may also define the ratio of the point count in the target obstacle point cloud to the area of the determined smallest circumscribing rectangle as the target value of the target obstacle point cloud in the direction indicated by the candidate direction information.

In the embodiment, the target value of the target obstacle point cloud in the direction indicated by the candidate direction information reflects the closeness of the smallest circumscribing rectangle generated in the direction indicated by the candidate direction information to the target obstacle in the physical world. The lower is the target value, the closer is the direction indicated by the candidate direction information to the practical direction of the target obstacle in the physical world.

In some optional implementations of the embodiment, the electronic device may perform target value calculation on each piece of candidate direction information in the candidate direction information set determined in the step 201. Here, the target value calculation may include following substep 2021 to substep 2024.

Substep 2021: determining the smallest circumscribing rectangle of the target obstacle point cloud in the direction indicated by the candidate direction information.

Substep 2022: calculating the area and the width-to-length ratio of the determined smallest circumscribing rectangle.

Substep 2023: determining the symmetry point count in the determined smallest circumscribing rectangle of the target obstacle point cloud.

In some optional implementations of the embodiment, the symmetry points may be two points symmetric with respect to the central axis of the target obstacle point cloud in the lengthwise direction. That is, a line segment formed by two points of the symmetry points is perpendicular to the central axis in the lengthwise direction, and the distance from either point of the symmetry points to the central axis in the lengthwise direction is equal. The central axis in the lengthwise direction is a geometric center line of the determined smallest circumscribing rectangle in the long side direction.

Figure 3B:
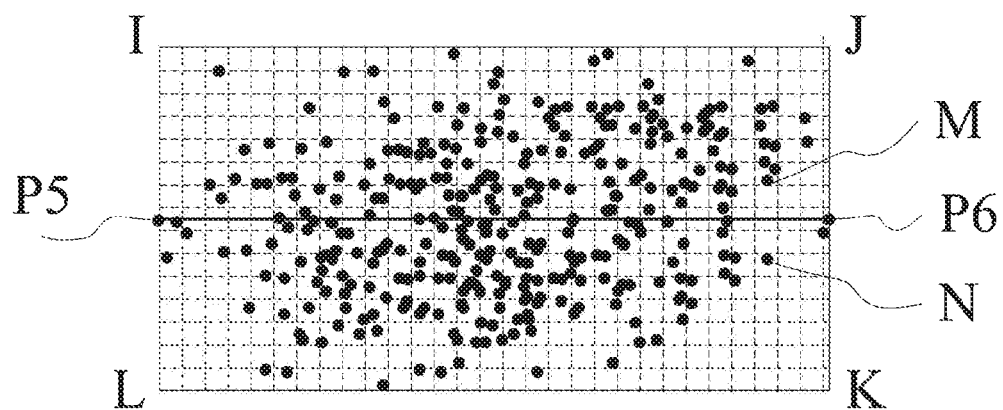
FIG. 3B is a schematic diagram of symmetry points in a smallest circumscribing rectangle of a target obstacle point cloud according to some embodiments of the present disclosure.

As an example, please refer to FIG. 3B. In FIG. 3B, the central axis of the smallest circumscribing rectangle IJHK in the lengthwise direction is a line segment P5-P6, and a point M and a point N in the smallest circumscribing rectangle IJHK are symmetric with respect to the line segment P5-P6, that is, the point M and the point N are symmetry points.

In some optional implementations of the embodiment, the determined smallest circumscribing rectangle may also be first divided into grids of an equal size. Then, if points in the target obstacle point cloud exist in two grids symmetric with respect to the central axis in the lengthwise direction, then the two grids symmetric with respect to the central axis in the lengthwise direction are defined as symmetry points. As an example, FIG. 3B shows a schematic diagram of grid division of the smallest circumscribing rectangle.

Here, the two points that are symmetric with respect to the central axis in the lengthwise direction may be counted as two, or counted as one. This is not specifically limited in the present disclosure.

Substep 2024: determining the target value of the target obstacle point cloud in the direction indicated by the candidate direction information based on the calculated area and width-to-length ratio and the determined symmetry point count.

Here, the electronic device may determine the target value of the target obstacle point cloud in the direction indicated by the candidate direction information based on the calculated area and width-to-length ratio and the determined symmetry point count. Here, the target value of the target obstacle point cloud in the direction indicated by the candidate direction information is positively correlated with the calculated area and width-to-length ratio, and is negatively correlated with the determined symmetry point count.

Here, the smaller is the area of the generated smallest circumscribing rectangle in the direction indicated by the candidate direction information, the closer is the generated smallest circumscribing rectangle in the direction indicated by the candidate direction information to the practical situation of the target obstacle in the physical world, and the smaller is the target value in the direction indicated by the candidate direction information. Otherwise, the larger is the area of the generated smallest circumscribing rectangle in the direction indicated by the candidate direction information, the farther is the generated smallest circumscribing rectangle in the direction indicated by the candidate direction information from the practical situation of the target obstacle in the physical world, and the larger is the target value in the direction indicated by the candidate direction information. That is, the target value in the direction indicated by the candidate direction information is positively correlated with the area of the generated smallest circumscribing rectangle in the direction indicated by the candidate direction information.

Here, the smaller is the width-to-length ratio of the generated smallest circumscribing rectangle in the direction indicated by the candidate direction information, the closer is the generated smallest circumscribing rectangle in the direction indicated by the candidate direction information to the practical situation of the target obstacle in the physical world, and the smaller is the target value in the direction indicated by the candidate direction information. Otherwise, the larger is the width-to-length ratio of the generated smallest circumscribing rectangle in the direction indicated by the candidate direction information, the farther is the generated smallest circumscribing rectangle in the direction indicated by the candidate direction information from the practical situation of the target obstacle in the physical world, and the larger is the target value in the direction indicated by the candidate direction information. That is, the target value in the direction indicated by the candidate direction information is positively correlated with the width-to-length ratio of the generated smallest circumscribing rectangle in the direction indicated by the candidate direction information.

Furthermore, the higher is the symmetry point count in the generated smallest circumscribing rectangle in the direction indicated by the candidate direction information, the closer is the generated smallest circumscribing rectangle in the direction indicated by the candidate direction information to the practical situation of the target obstacle in the physical world, and the smaller is the target value in the direction indicated by the candidate direction information. Otherwise, the lower is the symmetry point count in the generated smallest circumscribing rectangle in the direction indicated by the candidate direction information, the farther is the generated smallest circumscribing rectangle in the direction indicated by the candidate direction information from the practical situation of the target obstacle in the physical world, and the larger is the target value in the direction indicated by the candidate direction information. That is, the target value in the direction indicated by the candidate direction information is negatively correlated with the symmetry point count in the generated smallest circumscribing rectangle in the direction indicated by the candidate direction information.

As an example, the target value of the target obstacle point cloud in the direction indicated by the candidate direction information may be determined as per formula 1.

$$E_{dir}=(w_1 \times \text{area} + w_2 \times \text{width/length} + w_3 \times \text{symmetry}) \quad (1)$$

Here, dir is the candidate direction information; $E_{dir}$ is the calculated target value in the direction indicated by the candidate direction information; area is the area of the smallest circumscribing rectangle of the target obstacle point cloud in the direction indicated by the candidate direction information; width is the width of the smallest circumscribing rectangle of the target obstacle point cloud in the direction indicated by the candidate direction information; length is the length of the smallest circumscribing rectangle of the target obstacle point cloud in the direction indicated by the candidate direction information; symmetry is the symmetry point count in the smallest circumscribing rect-angle of the target obstacle point cloud in the direction indicated by the candidate direction information; and $w_1$, $w_2$ and $w_3$ are preset weights.

Step 203: defining candidate direction information having a minimum target value in the candidate direction information set as direction information corresponding to the target obstacle cloud point.

The target value in the direction indicated by the each piece of direction information in the candidate direction information set has been calculated in the step 202, and the smaller is the target value, the closer is the direction indicated by the candidate direction information to the practical direction of the target obstacle in the physical world. Therefore, in the step 203, the electronic device may define candidate direction information having the minimum target value in the candidate direction information set as direction information corresponding to the target obstacle cloud point.

Step 204: outputting the direction information corresponding to the target obstacle cloud point.

In the embodiment, the electronic device determines the direction information corresponding to the target obstacle point cloud to subsequently track the target obstacle and then perform route planning for the autonomous vehicle. Therefore, the electronic device may output the direction information corresponding to the target obstacle point cloud to a relevant function module (e.g., a program function module or a hardware function module) requiring the direction information corresponding to the target obstacle point cloud.

The method provided by the above embodiments of the present disclosure calculates the target value of the each piece of candidate direction information in the candidate direction information set of the target obstacle point cloud, defines candidate direction information having the minimum target value in the candidate direction information set as the direction information corresponding to the target obstacle cloud point, and finally outputs the direction information corresponding to the target obstacle cloud point, thereby improving the abundance of content of outputted obstacle information.

Figure 4A:
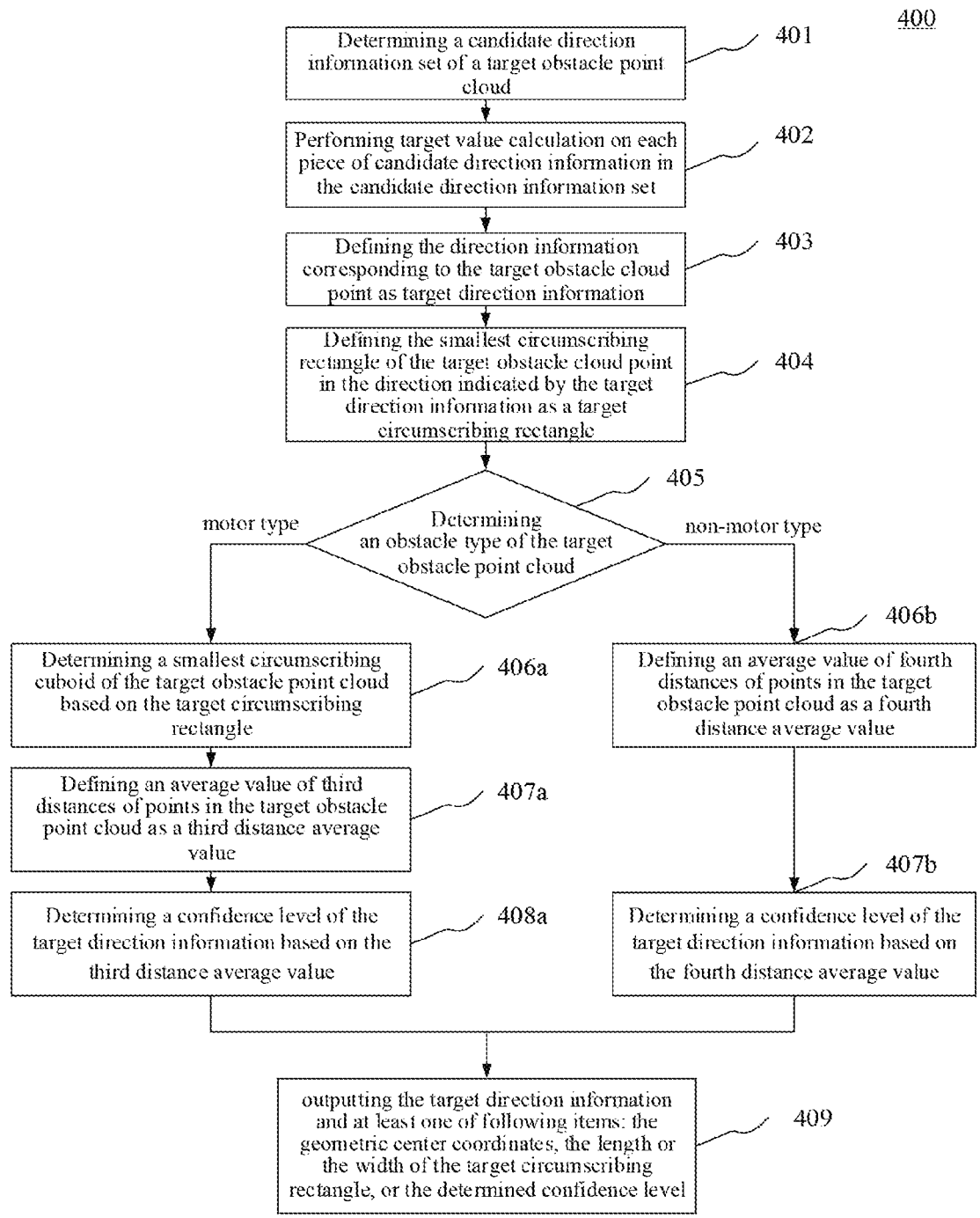
FIG. 4A is a flowchart of another embodiment of a method for outputting obstacle information according to the present disclosure.

Please further refer to FIG. 4, FIG. 4 shows a flow 400 of another embodiment of a method for outputting obstacle information. The flow 400 of the method for outputting obstacle information includes the following steps.

Step 401: determining a candidate direction information set of a target obstacle point cloud.

Specific operations in the step 401 in the embodiment are basically identical to those in the step 201 in the embodiment shown in FIG. 2, and are not repeatedly described any more here.

In addition, in the embodiment, each target obstacle point cloud may be set with an associated obstacle type. The obstacle type may include a motor vehicle type or a non-motor vehicle type.

Step 402: performing target value calculation on each piece of candidate direction information in the candidate direction information set.

Figure 4B:
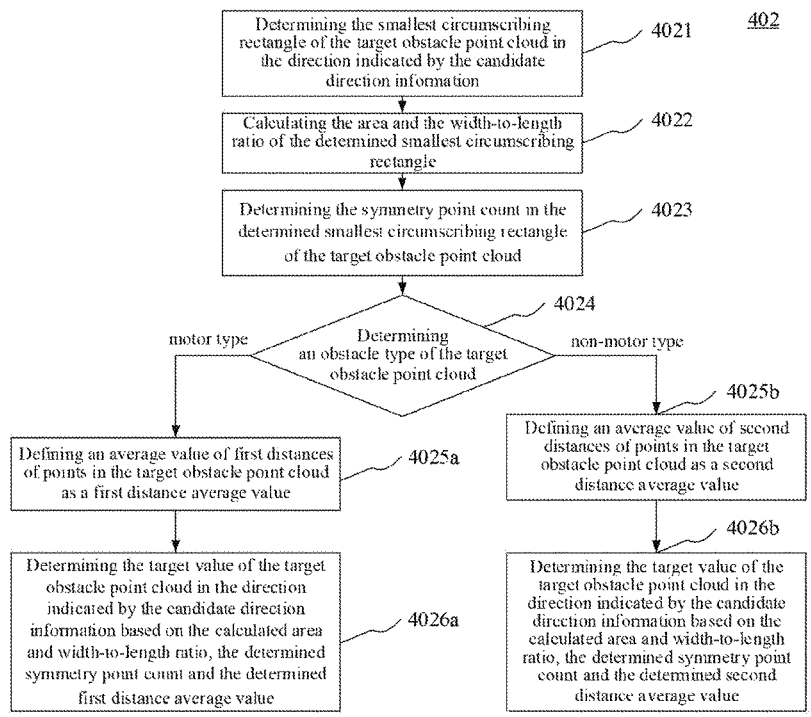
FIG. 4B is a sub-flowchart of step 402 in the flowchart shown in FIG. 4A according to some embodiments of the present disclosure.

In the embodiment, the electronic device may perform target value calculation on each piece of candidate direction information in the candidate direction information set determined in the step 401. As shown in FIG. 4B, the target value calculation may include following substeps 4021, 4022, 4023, 4024, 4025a, 4026a, 4025b and 4026b.

Substep 4021: determining the smallest circumscribing rectangle of the target obstacle point cloud in the direction indicated by the candidate direction information.

Substep 4022: calculating the area and the width-to-length ratio of the determined smallest circumscribing rectangle.

Substep 4023: determining the symmetry point count in the determined smallest circumscribing rectangle of the target obstacle point cloud.

Specific operations in the substep 4021, the substep 4022 and the substep 4023 in the embodiment are basically identical to those in the substep 2021, the substep 2022 and the substep 2023 in the embodiment shown in FIG. 2, and are not repeatedly described any more here.

Substep 4024: determining an obstacle type of the target obstacle point cloud. The flow proceeds to substep 4025a if the obstacle type is a vehicle type, and proceeds to substep 4025b if the obstacle type is a non-motor vehicle type.

Substep 4025a: defining an average value of first distances of points in the target obstacle point cloud as a first distance average value.

In the embodiment, the electronic device may define an average value of first distances of points in the target obstacle point cloud as the first distance average value when the obstacle type of the target obstacle point cloud is determined as a motor vehicle type in the substep 4024. The first distance of a point in the target obstacle point cloud is a minimum value of shortest distances from the point to four sides of the determined smallest circumscribing rectangle. The flow proceeds to substep 4026a after the substep 4025a is performed.

Substep 4026a: determining the target value of the target obstacle point cloud in the direction indicated by the candidate direction information based on the calculated area and width-to-length ratio, the determined symmetry point count and the determined first distance average value.

In the embodiment, the electronic device may determine the target value of the target obstacle point cloud in the direction indicated by the candidate direction information based on the calculated area and width-to-length ratio, the determined symmetry point count and the determined first distance average value.

Here, the target value of the target obstacle point cloud in the direction indicated by the candidate direction information is positively correlated with the calculated area and width-to-length ratio, and the determined first distance average value, and is negatively correlated with the determined symmetry point count.

Here, the determined first distance average value of reflects the average value of shortest distances from a point in the target obstacle point cloud to four sides of the determined smallest circumscribing rectangle. Data of outside motor vehicles collected by most of existing vehicle sensors are mostly surface data of the motor vehicles. Therefore, the smaller is the first distance average value, the closer is the direction indicated by the candidate direction information to the practical direction of the target obstacle in the physical world, and the smaller is the target value in the direction indicated by the candidate direction information. Otherwise, the larger is the first distance average value, the farther is the direction indicated by the candidate direction information from the practical direction of the target obstacle in the physical world, and the larger is the target value in the direction indicated by the candidate direction information. That is, the target value in the direction indicated by the candidate direction information is positively correlated with the determined first distance average value.

As an example, the target value of the target obstacle point cloud in the direction indicated by the candidate direction information may be determined as per formula 2.

$$E_{dir}=(w_1 \times area + w_2 \times width/length + w_3 \times symmetry + w_4 \times distance_1) \quad (2)$$

Here, dir is the candidate direction information; $E_{dir}$ is the calculated target value in the direction indicated by the candidate direction information; area is the area of the smallest circumscribing rectangle of the target obstacle point cloud in the direction indicated by the candidate direction information; width is the width of the smallest circumscribing rectangle of the target obstacle point cloud in the direction indicated by the candidate direction information; length is the length of the smallest circumscribing rectangle of the target obstacle point cloud in the direction indicated by the candidate direction information; symmetry is the symmetry point count in the smallest circumscribing rectangle of the target obstacle point cloud in the direction indicated by the candidate direction information; $distance_1$ is the determined first distance average value; and $w_1$, $w_2$, $w_3$ and $w_4$ are preset weights.

The flow proceeds to step 403 after the substep 4026a is performed.

Substep 4025b: defining an average value of second distances of points in the target obstacle point cloud as a second distance average value.

In the embodiment, the electronic device may define an average value of second distances of points in the target obstacle point cloud as the second distance average value when the obstacle type of the target obstacle point cloud is determined as a non-motor vehicle type in the substep 4024. Here, the second distance of a point in the target obstacle point cloud is a shortest distance from the point to a central axis line segment, and the central axis line segment is a geometric center line of the determined smallest circumscribing rectangle along the direction indicated by the candidate direction information. The flow proceeds to substep 4026b after the substep 4025b is performed.

Substep 4026b: determining the target value of the target obstacle point cloud in the direction indicated by the candidate direction information based on the calculated area and width-to-length ratio, the determined symmetry point count and the determined second distance average value.

In the embodiment, the electronic device may determine the target value of the target obstacle point cloud in the direction indicated by the candidate direction information based on the calculated area and width-to-length ratio, the determined symmetry point count and the determined second distance average value. Here, the target value of the target obstacle point cloud in the direction indicated by the candidate direction information is positively correlated with the calculated area and width-to-length ratio, and the determined second distance average value, and is negatively correlated with the determined symmetry point count.

Here, the determined second distance average value reflects the distance from a point in the target obstacle point cloud to the central axis line segment of the determined smallest circumscribing rectangle. Because a non-motor vehicle has a relatively small area and volume, compared with a motor vehicle, data of outside non-motor vehicles collected by most vehicle sensors are relatively focused. Therefore, the smaller is the second distance average value, the more focused are the collected data, i.e, the closer is the direction indicated by the candidate direction information to the practical direction of the target obstacle in the physical world, and the smaller is the target value in the direction indicated by the candidate direction information. Otherwise, the larger is the second distance average value, the more defocused are the collected data, i.e., the farther is the direction indicated by the candidate direction information from the practical direction of the target obstacle in the physical world, and the larger is the target value in the direction indicated by the candidate direction information. That is, the target value in the direction indicated by the candidate direction information is positively correlated with the determined second distance average value.

As an example, the target value of the target obstacle point cloud in the direction indicated by the candidate direction information may be determined as per formula 3.

$$E_{dir}=(w_1\times area+w_2\times width/length+w_3\times symmetry+w_4\times distance_2) \quad (3)$$

Here, dir is the candidate direction information; $E_{dir}$ is the calculated target value in the direction indicated by the candidate direction information; area is the area of the smallest circumscribing rectangle of the target obstacle point cloud in the direction indicated by the candidate direction information; width is the width of the smallest circumscribing rectangle of the target obstacle point cloud in the direction indicated by the candidate direction information; length is the length of the smallest circumscribing rectangle of the target obstacle point cloud in the direction indicated by the candidate direction information; symmetry is the symmetry point count in the smallest circumscribing rectangle of the target obstacle point cloud in the direction indicated by the candidate direction information; $distance_2$ is the determined second distance average value; and $w_1$, $w_2$, $w_3$ and $w_4$ are preset weights.

The flow proceeds to step 403 after the substep 402b6 is performed.

Step 403: defining the direction information corresponding to the target obstacle cloud point as target direction information.

Step 404: defining the smallest circumscribing rectangle of the target obstacle cloud point in the direction indicated by the target direction information as a target circumscribing rectangle.

Step 405: determining an obstacle type of the target obstacle point cloud. The flow proceeds to step 406a if the obstacle type is a vehicle type, and proceeds to step 406b if the obstacle type is a non-motor vehicle type.

Step 406a: determining a smallest circumscribing cuboid of the target obstacle point cloud based on the target circumscribing rectangle.

In the embodiment, the electronic device may determine a smallest circumscribing cuboid of the target obstacle point cloud based on the target circumscribing rectangle, when the obstacle type of the target obstacle point cloud is determined to be a motor vehicle type in the step 405. That is, 2D coordinates corresponding to four vertexes of the target circumscribing rectangle are used as corresponding plane 2D coordinates in 3D coordinates corresponding to eight vertexes of the smallest circumscribing cuboid of the target obstacle point cloud, and height coordinates in the 3D coordinates may be determined by calculating minimum and maximum values of height coordinates of points in the target obstacle point cloud in the 3D coordinates. The flow proceeds to step 407a after the step 406a is performed.

Step 407a: defining an average value of third distances of points in the target obstacle point cloud as a third distance average value.

In the embodiment, the electronic device may determine an average value of third distances of points in the target obstacle point cloud as the third distance average value. Here, the third distance of a point in the target obstacle point cloud is a minimum value of shortest distances from the point to six sides of the smallest circumscribing cuboid. The flow proceeds to step 408a after the step 407a is performed.

Step 408a: determining a confidence level of the target direction information based on the third distance average value.

In the embodiment, the electronic device may determine a confidence level of the target direction information based on the third distance average value. Here, the determined confidence level is negatively correlated with the third distance average value.

Here, the third distance average value reflects the average value of shortest distances from points in the target obstacle point cloud to six sides of the smallest circumscribing cuboid. The larger is the third distance average value, the longer is the average distance from a point in the target obstacle point cloud to the smallest circumscribing cuboid, i.e., the farther is the smallest circumscribing cuboid from the practical situation of the target obstacle in the physical world. The smallest circumscribing cuboid is formed based on the smallest circumscribing rectangle corresponding to the determined target direction information, thereby indicating that the target direction information has a low confidence level. Otherwise, the smaller is the third distance average value, the shorter is the average distance from a point in the target obstacle point cloud to the smallest circumscribing cuboid, i.e., the closer is the smallest circumscribing cuboid to the practical situation of the target obstacle in the physical world. The smallest circumscribing cuboid is formed based on the smallest circumscribing rectangle corresponding to the determined target direction information, thereby indicating that the target direction information has a high confidence level. In conclusion, the confidence level of the target direction information is negatively correlated with the third distance average value.

As an example, the reciprocal of the third distance average value may be used as the confidence level of the target obstacle point cloud in the direction indicated by the target direction information.

The flow proceeds to step 409 after the step 408a is performed.

Step 406b: defining an average value of fourth distances of points in the target obstacle point cloud as a fourth distance average value.

In the embodiment, the electronic device may determine an average value of fourth distances of points in the target obstacle point cloud as the fourth distance average value when the obstacle type of the target obstacle point cloud is determined to be a non-motor vehicle type in the step 405. Here, the fourth distance of a point in the target obstacle point cloud is a shortest distance from the point to the geometric center line of the target circumscribing rectangle along the direction indicated by the target direction information. The flow proceeds to step 407b after the step 406b is performed.

Step 407b: determining a confidence level of the target direction information based on the fourth distance average value.

In the embodiment, the electronic device may determine a confidence level of the target direction information based on the fourth distance average value. Here, the determined confidence level is negatively correlated with the fourth distance average value.

Here, the fourth average distance reflects an average value of shortest distances from points in the target obstacle point cloud to the geometric center line of the target circumscribing rectangle along the direction indicated by the target direction information. The larger is the fourth distance average value, the longer is a distance from a point in the target obstacle point cloud to the geometric center line of the target circumscribing rectangle along the direction indicated by the target direction information, i.e., the more defocused are the data of the target obstacle point cloud from the direction indicated by the target direction information. Because a non-motor vehicle has a relatively small area and volume, the target obstacle point cloud of the non-motor vehicle type may be regularly focused in the vicinity of a line, i.e., focused in the vicinity of a line corresponding to the practical direction of the target obstacle in the physical world. Therefore, the larger is the fourth distance average value, the farther is the direction indicated by the target direction information from the practical direction of the target obstacle in the physical world. The smallest circumscribing cuboid is formed based on the smallest circumscribing rectangle corresponding to the determined target direction information, thereby indicating that the target direction information has a low confidence level. Otherwise, the smaller is the fourth distance average value, the shorter is a distance from a point in the target obstacle point cloud to the geometric center line of the target circumscribing rectangle along the direction indicated by the target direction information, i.e., the more focused are the data of the target obstacle point cloud in the direction indicated by the target direction information. Therefore, the smaller is the fourth distance average value, the closer is the direction indicated by the target direction information to the practical direction of the target obstacle in the physical world. The smallest circumscribing cuboid is formed based on the smallest circumscribing rectangle corresponding to the determined target direction information, thereby indicating that the target direction information has a high confidence level. In conclusion, the confidence level of the target direction information is negatively correlated with the fourth distance average value.

As an example, the reciprocal of the fourth distance average value may be used as the confidence level of the target direction information.

The flow proceeds to step 409 after the step 407b is performed.

Step 409: outputting the target direction information and at least one of following items: the geometric center coordinates, the length or the width of the target circumscribing rectangle, or the determined confidence level.

In the embodiment, the electronic device may output the target direction information and at least one of following items: the geometric center coordinates, the length or the width of the target circumscribing rectangle, or the determined confidence level. Specifically, the target direction information may be outputted to a relevant function module (e.g., a program function module or a hardware function module) requiring the direction information corresponding to the target obstacle point cloud. The geometric center coordinates of the target circumscribing rectangle may be outputted to a relevant function module requiring the geometric center coordinates of the target circumscribing rectangle. The length and width of the target circumscribing rectangle may be outputted to a relevant function module requiring the length and width of the target circumscribing rectangle. The determined confidence level may be outputted to a relevant function module requiring the determined confidence level.

As may be seen from FIG. 4, compared with the embodiment corresponding to FIG. 2, the flow 400 of the method for outputting obstacle information in the embodiment highlights calculating the target value of each piece of candidate direction information in the candidate direction information set using different methods respectively when the obstacle type of the target obstacle point cloud is a motor vehicle type and a non-motor vehicle type, additionally provides calculating respectively the confidence level of the target direction information when the obstacle type of the target obstacle point cloud is a motor vehicle type and a non-motor vehicle type, and highlights outputting other information besides outputting the target direction information. Therefore, the solution according to the embodiment may employ different target value calculation methods and confidence level calculation methods based on the obstacle types, and further enriches the abundance of content of outputted obstacle information.

Figure 5:
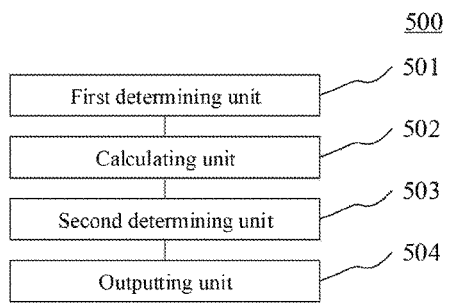
FIG. 5 is a structural schematic diagram of an embodiment of an apparatus for outputting obstacle information according to the present disclosure.

Please further refer to FIG. 5. As implementations of the method shown in the figures, the present disclosure provides an embodiment of an apparatus for outputting obstacle information. The embodiment of the apparatus corresponds to the embodiment of the method shown in FIG. 2, and the apparatus may be specifically applied to various electronic devices.

As shown in FIG. 5, an apparatus 500 for outputting obstacle information according to the embodiment includes: a first determining unit 501, a calculating unit 502, a second determining unit 503, and an outputting unit 504. The first determining unit 501 is configured for determining a candidate direction information set of a target obstacle point cloud; the calculating unit 502 is configured for determining, for each piece of candidate direction information in the candidate direction information set, a target value of the target obstacle point cloud in a direction indicated by the candidate direction information based on the target obstacle point cloud and a smallest circumscribing rectangle of the target obstacle point cloud in the direction indicated by the candidate direction information; the second determining unit 503 is configured for defining candidate direction information having a minimum target value in the candidate direction information set as direction information corresponding to the target obstacle cloud point; and the outputting unit 504 is configured for outputting the direction information corresponding to the target obstacle cloud point.

Specific processing of the first determining unit 501, the calculating unit 502, the second determining unit 503, and the outputting unit 504 of the apparatus 500 for outputting obstacle information according to the embodiment and technical effects brought thereby may be respectively referred to in relevant description of the steps 201, 202, 203 and 204 in the embodiment corresponding to FIG. 2, and are not repeatedly described any more here.

In some optional implementations of the embodiment, the calculating unit may be further used for: performing following target value calculation: determining the smallest circumscribing rectangle of the target obstacle point cloud in the direction indicated by the candidate direction information; calculating an area and a width-to-length ratio of the determined smallest circumscribing rectangle; determining a symmetry point count in the target obstacle point cloud in the determined smallest circumscribing rectangle; and determining the target value of the target obstacle point cloud in the direction indicated by the candidate direction information based on the calculated area and width-to-length ratio and the determined symmetry point count, wherein the target value of the target obstacle point cloud in the direction indicated by the candidate direction information is positively correlated with the calculated area and width-to-length ratio, and is negatively correlated with the determined symmetry point count.

In some optional implementations of the embodiment, the target obstacle point cloud is set with an associated obstacle type including a motor vehicle type or a non-motor vehicle type.

In some optional implementations of the embodiment, the determining the target value of the target obstacle point cloud in the direction indicated by the candidate direction information based on the calculated area and width-to-length ratio and the determined symmetry point count may include: defining an average value of first distances of points in the target obstacle point cloud as a first distance average value, in response to determining the obstacle type of the target obstacle point cloud being the motor vehicle type, wherein the first distance of a point in the target obstacle point cloud is a minimum value of shortest distances from the point to four sides of the determined smallest circumscribing rectangle; and determining the target value of the target obstacle point cloud in the direction indicated by the candidate direction information based on the calculated area and width-to-length ratio, the determined symmetry point count, and the determined first distance average value, wherein the target value of the target obstacle point cloud in the direction indicated by the candidate direction information is positively correlated with the calculated area and width-to-length ratio, and the determined first distance average value, and is negatively correlated with the determined symmetry point count.

In some optional implementations of the embodiment, the determining the target value of the target obstacle point cloud in the direction indicated by the candidate direction information based on the calculated area and width-to-length ratio and the determined symmetry point count may further include: defining an average value of second distances of points in the target obstacle point cloud as a second distance average value, in response to determining the obstacle type of the target obstacle point cloud being a non-motor vehicle type, wherein the second distance of a point in the target obstacle point cloud is a shortest distance from the point to a central axis line segment, and the central axis line segment is a geometric center line of the determined smallest circumscribing rectangle along the direction indicated by the candidate direction information; and determining the target value of the target obstacle point cloud in the direction indicated by the candidate direction information based on the calculated area and width-to-length ratio, the determined symmetry point count, and the determined second distance average value, wherein the target value of the target obstacle point cloud in the direction indicated by the candidate direction information is positively correlated with the calculated area and width-to-length ratio, and the determined second distance average value, and is negatively correlated with the determined symmetry point count.

In some optional implementations of the embodiment, the apparatus 500 may further include: a third determining unit (not shown), configured for defining the direction information corresponding to the target obstacle cloud point as target direction information; a fourth determining unit (not shown), configured for defining the smallest circumscribing rectangle of the target obstacle cloud point in the direction indicated by the target direction information as a target circumscribing rectangle; and the outputting unit may be further used for: outputting the target direction information and at least one of: geometric center coordinates, a length or a width of the target circumscribing rectangle.

In some optional implementations of the embodiment, the apparatus 500 may further include: a fifth determining unit (not shown), configured for determining a confidence level of the target direction information based on the target obstacle cloud point and the target circumscribing rectangle; and the outputting unit 204 may be further used for: outputting the target direction information and at least one of: the geometric center coordinates, the length or the width of the target circumscribing rectangle, or the determined confidence level.

In some optional implementations of the embodiment, the fifth determining unit (not shown) may be further used for: determining a smallest circumscribing cuboid of the target obstacle point cloud based on the target circumscribing rectangle, in response to determining the obstacle type of the target obstacle point cloud being the motor vehicle type; defining an average value of third distances of points in the target obstacle point cloud as a third distance average value, wherein the third distance of a point in the target obstacle point cloud is a minimum value of shortest distances from the point to six sides of the smallest circumscribing cuboid; and determining the confidence level of the target direction information based on the third distance average value, wherein the determined confidence level is negatively correlated with the third distance average value.

In some optional implementations of the embodiment, the fifth determining unit (not shown) may be further used for: defining an average value of fourth distances of points in the target obstacle point cloud as a fourth distance average value, in response to determining the obstacle type of the target obstacle point cloud being the non-motor vehicle type, wherein the fourth distance of a point in the target obstacle point cloud is a shortest distance from the point to a geometric center line of the target circumscribing rectangle along the direction indicated by the target direction information; and determining the confidence level of the target direction information based on the fourth distance average value, wherein the determined confidence level is negatively correlated with the fourth distance average value.

It should be noted that implementation details and technical effects of the units in the apparatus for outputting obstacle information according to the embodiment of the present disclosure may be referred to in the description of other embodiments in the present disclosure, and are not repeatedly described any more here.

Figure 6:
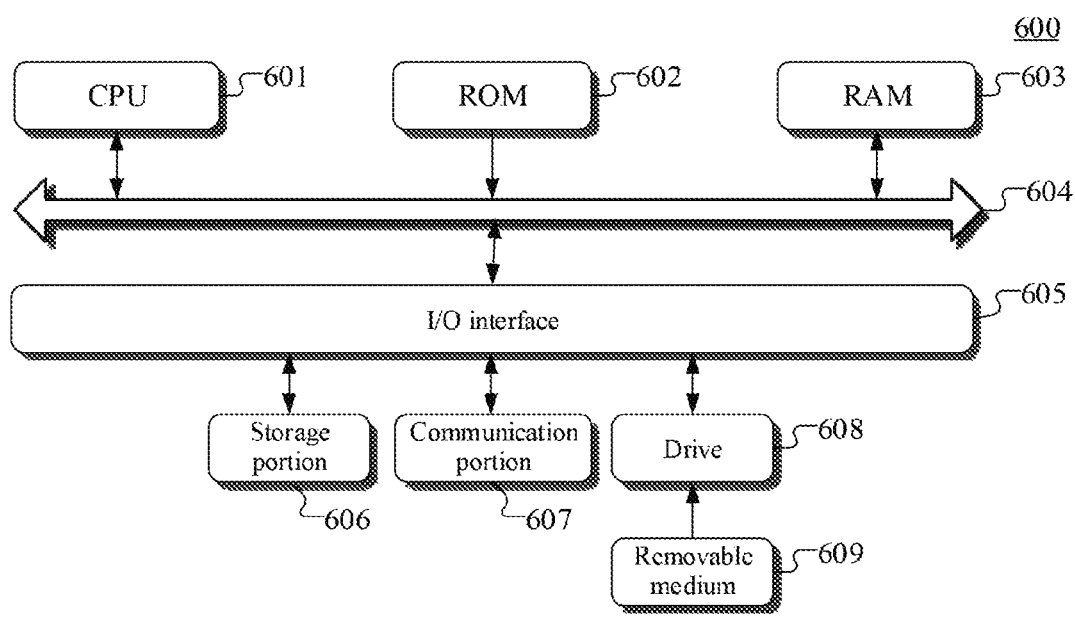
FIG. 6 is a structural schematic diagram of a computer system adapted to implement an electronic device according to an embodiment of the present disclosure.

Referring to FIG. 6, a schematic structural diagram of a computer system 600 adapted to implement an electronic device of the embodiments of the present disclosure is shown. The electronic device shown in FIG. 6 is merely an example, and should not bring any limitations to the functions and the scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 606. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: a storage portion 606 including a hard disk and the like; and a communication portion 607 comprising a network interface card, such as a LAN card and a modem. The communication portion 607 performs communication processes via a network, such as the Internet. A driver 608 is also connected to the I/O interface 605 as required. A removable medium 609, such as a magnetic disk, an optical disk, a magneto-optical disk, and a semiconductor memory, may be installed on the driver 608, to facilitate the retrieval of a computer program from the removable medium 609, and the installation thereof on the storage portion 606 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 607, and/or may be installed from the removable media 609. The computer program, when executed by the central processing unit (CPU) 601, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any physical medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, comprising a first determining unit, a calculating unit, a second determining unit, and an outputting unit, where the names of these units do not in some cases constitute a limitation to such units themselves. For example, the outputting unit may also be described as "a unit for outputting the direction information."

In another aspect, some embodiments of the present disclosure further provide a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by an apparatus, cause the apparatus to: determining a candidate direction information set of a target obstacle point cloud; determining, for each piece of candidate direction information in the candidate direction information set, a target value of the target obstacle point cloud in a direction indicated by the candidate direction information based on the target obstacle point cloud and a smallest circumscribing rectangle of the target obstacle point cloud in the direction indicated by the candidate direction information; defining candidate direction information having a minimum target value in the candidate direction information set as direction information corresponding to the target obstacle cloud point; and outputting the direction information corresponding to the target obstacle cloud point.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for outputting obstacle information by a vehicle comprising:
    obtaining three-dimensional point cloud data collected by various vehicle sensors disposed on the vehicle;
    determining a set of two-dimensional plane coordinates corresponding to a target obstacle point cloud based on the three-dimensional point cloud data;
    determining a candidate direction information set of the target obstacle point cloud based on the set of two-dimensional plane coordinates;

for each piece of candidate direction information in the candidate direction information set, determining a target value of the target obstacle point cloud in a direction indicated by the each piece of candidate direction information, based on the target obstacle point cloud and a circumscribing rectangle of the target obstacle point cloud in the direction indicated by the each piece of candidate direction information;

defining candidate direction information including a minimum target value in the candidate direction information set as direction information corresponding to the target obstacle point cloud;

outputting the direction information corresponding to the target obstacle point cloud; and tracking an obstacle corresponding to the target obstacle point cloud for route planning based on the direction information corresponding to the target obstacle point cloud, wherein the obstacle corresponds to a physical object within a distance from the vehicle, wherein the circumscribing rectangle of the target obstacle point cloud in the direction indicated by the each piece of candidate direction information is determined by: determining a plurality of circumscribing rectangles for the physical object each corresponding to the various vehicle sensors providing the three-dimensional point cloud data, and selecting a circumscribing rectangle of the plurality of circumscribing rectangles with the smallest width-to-length ratio, and wherein tracking the obstacle is further based on the selected circumscribing rectangle, and wherein the method is performed by at least one processor.

2. The method according to claim 1, wherein the determining the target value of the target obstacle point cloud in the direction indicated by the each piece of candidate direction information, based on the target obstacle point cloud and the circumscribing rectangle of the target obstacle point cloud in the direction indicated by the each piece of candidate direction information comprises:

performing following target value calculation: determining the circumscribing rectangle of the target obstacle point cloud in the direction indicated by the each piece of candidate direction information; calculating an area and a width-to-length ratio of the determined circumscribing rectangle; determining a symmetry point count in the determined circumscribing rectangle of the target obstacle point cloud; and determining the target value of the target obstacle point cloud in the direction indicated by the each piece of candidate direction information based on the calculated area and width-to-length ratio and the determined symmetry point count, wherein the target value of the target obstacle point cloud in the direction indicated by the each piece of candidate direction information is positively correlated with the calculated area and width-to-length ratio, and is negatively correlated with the determined symmetry point count; wherein the symmetry point count is a number of symmetry points in the determined circumscribing rectangle with respect to a geometric center line of the determined circumscribing rectangle in a long side direction.

3. The method according to claim 2, wherein the target obstacle point cloud is set with an associated obstacle type including a motor vehicle or a non-motor vehicle.

4. The method according to claim 3, wherein the determining the target value of the target obstacle point cloud in the direction indicated by the each piece of candidate direction information based on the calculated area and width-to-length ratio and the determined symmetry point count comprises:

defining an average value of first distances of points in the target obstacle point cloud as a first distance average value, in response to determining the associated obstacle type of the target obstacle point cloud being the motor vehicle, wherein a first distance of a point in the target obstacle point cloud is a minimum value of distances from the point to four sides of the determined circumscribing rectangle; and determining the target value of the target obstacle point cloud in the direction indicated by the each piece of candidate direction information based on the calculated area and width-to-length ratio, the determined symmetry point count, and the determined first distance average value, wherein the target value of the target obstacle point cloud in the direction indicated by the each piece of candidate direction information is positively correlated with the calculated area and width-to-length ratio, and the determined first distance average value, and is negatively correlated with the determined symmetry point count.

5. The method according to claim 3, wherein the determining the target value of the target obstacle point cloud in the direction indicated by the each piece of candidate direction information based on the calculated area and width-to-length ratio and the determined symmetry point count comprises:

defining an average value of second distances of points in the target obstacle point cloud as a second distance average value, in response to determining the associated obstacle type of the target obstacle point cloud being the non-motor vehicle, wherein a second distance of a point in the target obstacle point cloud is a distance from the point to a central axis line segment, and the central axis line segment is the geometric center line of the determined circumscribing rectangle along the direction indicated by the each piece of candidate direction information; and determining the target value of the target obstacle point cloud in the direction indicated by the each piece of candidate direction information based on the calculated area and width-to-length ratio, the determined symmetry point count, and the determined second distance average value, wherein the target value of the target obstacle point cloud in the direction indicated by the each piece of candidate direction information is positively correlated with the calculated area and width-to-length ratio, and the determined second distance average value, and is negatively correlated with the determined symmetry point count.

6. The method according to claim 5, wherein before the outputting the direction information corresponding to the target obstacle point cloud, the method further comprises:

defining the direction information corresponding to the target obstacle point cloud as target direction information;

defining the circumscribing rectangle of the target obstacle point cloud in the direction indicated by the target direction information as a target circumscribing rectangle; and the outputting the direction information corresponding to the target obstacle point cloud comprises:

outputting the target direction information and at least one of: geometric center coordinates, a length or a width of the target circumscribing rectangle.

7. The method according to claim 6, wherein the outputting the target direction information and at least one of: geometric center coordinates, the length or the width of the target circumscribing rectangle comprises:
  determining a confidence level of the target direction information based on the target obstacle point cloud and the target circumscribing rectangle; and
  outputting the target direction information and at least one of: the geometric center coordinates, the length or the width of the target circumscribing rectangle, or the determined confidence level.

8. The method according to claim 7, wherein the determining the confidence level of the target direction information based on the target obstacle point cloud and the target circumscribing rectangle comprises:
  determining a circumscribing cuboid of the target obstacle point cloud based on the target circumscribing rectangle, in response to determining the associated obstacle type of the target obstacle point cloud being the motor vehicle;
  defining an average value of third distances of points in the target obstacle point cloud as a third distance average value, wherein a third distance of a point in the target obstacle point cloud is a minimum value of distances from the point to six sides of the circumscribing cuboid; and
  determining the confidence level of the target direction information based on the third distance average value, wherein the determined confidence level is negatively correlated with the third distance average value.

9. The method according to claim 7, wherein the determining the confidence level of the target direction information based on the target obstacle point cloud and the target circumscribing rectangle comprises:
  defining an average value of fourth distances of points in the target obstacle point cloud as a fourth distance average value, in response to determining the associated obstacle type of the target obstacle point cloud being the non-motor vehicle, wherein a fourth distance of a point in the target obstacle point cloud is a distance from the point to a geometric center line of the target circumscribing rectangle along the direction indicated by the target direction information; and
  determining the confidence level of the target direction information based on the fourth distance average value, wherein the determined confidence level is negatively correlated with the fourth distance average value.

10. An apparatus for outputting obstacle information, comprising:
  at least one processor; and
  a memory storing instructions, the instructions when executed by the at least one processor, cause the at least one processor to perform operations, the operations comprising:
  obtaining three-dimensional point cloud data collected by various vehicle sensors disposed on a vehicle;
  determining a set of two-dimensional plane coordinates corresponding to a target obstacle point cloud based on the three-dimensional point cloud data;
  determining a candidate direction information set of the target obstacle point cloud based on the set of two-dimensional plane coordinates;
  for each piece of candidate direction information in the candidate direction information set, determining a target value of the target obstacle point cloud in a direction indicated by the each piece of candidate direction information, based on the target obstacle point cloud and a circumscribing rectangle of the target obstacle point cloud in the direction indicated by the each piece of candidate direction information;
  defining candidate direction information including a minimum target value in the candidate direction information set as direction information corresponding to the target obstacle point cloud;
  outputting the direction information corresponding to the target obstacle point cloud; and
  tracking an obstacle corresponding to the target obstacle point cloud for route planning based on the direction information corresponding to the target obstacle point cloud, wherein the obstacle corresponds to a physical object within a distance from the vehicle, and
  wherein the circumscribing rectangle of the target obstacle point cloud in the direction indicated by the each piece of candidate direction information is determined by: determining a plurality of circumscribing rectangles for the physical object each corresponding to the various vehicle sensors providing the three-dimensional point cloud data, and selecting a circumscribing rectangle of the plurality of circumscribing rectangles with the smallest width-to-length ratio, and wherein tracking the obstacle is further based on the selected circumscribing rectangle.

11. The apparatus according to claim 10, wherein the determining the target value of the target obstacle point cloud in the direction indicated by the each piece of candidate direction information based on the target obstacle point cloud and the circumscribing rectangle of the target obstacle point cloud in the direction indicated by the each piece of candidate direction information comprises:
  performing following target value calculation: determining the circumscribing rectangle of the target obstacle point cloud in the direction indicated by the each piece of candidate direction information; calculating an area and a width-to-length ratio of the determined circumscribing rectangle; determining a symmetry point count in the determined circumscribing rectangle of the target obstacle point cloud; and determining the target value of the target obstacle point cloud in the direction indicated by the each piece of candidate direction information based on the calculated area and width-to-length ratio and the determined symmetry point count, wherein the target value of the target obstacle point cloud in the direction indicated by the each piece of candidate direction information is positively correlated with the calculated area and width-to-length ratio, and is negatively correlated with the determined symmetry point count; wherein the symmetry point count is a number of symmetry points in the determined circumscribing rectangle with respect to a geometric center line of the determined circumscribing rectangle in a long side direction.

12. The apparatus according to claim 11, wherein the target obstacle point cloud is set with an associated obstacle type including a motor vehicle or a non-motor vehicle.

13. The apparatus according to claim 12, wherein the determining the target value of the target obstacle point cloud in the direction indicated by the each piece of candidate direction information based on the calculated area and width-to-length ratio and the determined symmetry point count comprises:
  defining an average value of first distances of points in the target obstacle point cloud as a first distance average value, in response to determining the associated obstacle type of the target obstacle point cloud being the motor vehicle, wherein a first distance of a point in the target obstacle point cloud is a minimum value of distances from the point to four sides of the determined circumscribing rectangle; and determining the target value of the target obstacle point cloud in the direction indicated by the each piece of candidate direction information based on the calculated area and width-to-length ratio, the determined symmetry point count, and the determined first distance average value, wherein the target value of the target obstacle point cloud in the direction indicated by the each piece of candidate direction information is positively correlated with the calculated area and width-to-length ratio, and the determined first distance average value, and is negatively correlated with the determined symmetry point count.

14. The apparatus according to claim 12, wherein the determining the target value of the target obstacle point cloud in the direction indicated by the each piece of candidate direction information based on the calculated area and width-to-length ratio and the determined symmetry point count comprises:

defining an average value of second distances of points in the target obstacle point cloud as a second distance average value, in response to determining the associated obstacle type of the target obstacle point cloud being the non-motor vehicle, wherein a second distance of a point in the target obstacle point cloud is a distance from the point to a central axis line segment, and the central axis line segment is the geometric center line of the determined circumscribing rectangle along the direction indicated by the each piece of candidate direction information; and determining the target value of the target obstacle point cloud in the direction indicated by the each piece of candidate direction information based on the calculated area and width-to-length ratio, the determined symmetry point count, and the determined second distance average value, wherein the target value of the target obstacle point cloud in the direction indicated by the each piece of candidate direction information is positively correlated with the calculated area and width-to-length ratio, and the determined second distance average value, and is negatively correlated with the determined symmetry point count.

15. The apparatus according to claim 14, the operations further comprising:

defining the direction information corresponding to the target obstacle point cloud as target direction information;

defining the circumscribing rectangle of the target obstacle point cloud in the direction indicated by the target direction information as a target circumscribing rectangle; and the outputting the direction information corresponding to the target obstacle point cloud comprises:

outputting the target direction information and at least one of: geometric center coordinates, a length or a width of the target circumscribing rectangle.

16. The apparatus according to claim 15, wherein the outputting the target direction information and at least one of: geometric center coordinates, the length or the width of the target circumscribing rectangle comprises:

determining a confidence level of the target direction information based on the target obstacle point cloud and the target circumscribing rectangle; and outputting the target direction information and at least one of: the geometric center coordinates, the length or the width of the target circumscribing rectangle, or the determined confidence level.

17. The apparatus according to claim 16, wherein the determining the confidence level of the target direction information based on the target obstacle point cloud and the target circumscribing rectangle comprises:

determining a circumscribing cuboid of the target obstacle point cloud based on the target circumscribing rectangle, in response to determining the associated obstacle type of the target obstacle point cloud being the motor vehicle;

defining an average value of third distances of points in the target obstacle point cloud as a third distance average value, wherein a third distance of a point in the target obstacle point cloud is a minimum value of distances from the point to six sides of the circumscribing cuboid; and determining the confidence level of the target direction information based on the third distance average value, wherein the determined confidence level is negatively correlated with the third distance average value.

18. The apparatus according to claim 16, wherein the determining the confidence level of the target direction information based on the target obstacle point cloud and the target circumscribing rectangle comprises:

defining an average value of fourth distances of points in the target obstacle point cloud as a fourth distance average value, in response to determining the associated obstacle type of the target obstacle point cloud being the non-motor vehicle, wherein a fourth distance of a point in the target obstacle point cloud is a distance from the point to a geometric center line of the target circumscribing rectangle along the direction indicated by the target direction information; and determining the confidence level of the target direction information based on the fourth distance average value, wherein the determined confidence level is negatively correlated with the fourth distance average value.

19. A non-transitory computer storage medium storing a computer program, the computer program when executed by one or more processors, causes the one or more processors to perform operations, the operations comprising:

obtaining three-dimensional point cloud data collected by various vehicle sensors disposed on a vehicle;

determining a set of two-dimensional plane coordinates corresponding to a target obstacle point cloud based on the three-dimensional point cloud data;

determining a candidate direction information set of the target obstacle point cloud based on the set of two-dimensional plane coordinates;

for each piece of candidate direction information in the candidate direction information set, determining a target value of the target obstacle point cloud in a direction indicated by the each piece of candidate direction information based on the target obstacle point cloud and a circumscribing rectangle of the target obstacle point cloud in the direction indicated by the each piece of candidate direction information;

defining candidate direction information including a minimum target value in the candidate direction information set as direction information corresponding to the target obstacle point cloud;

outputting the direction information corresponding to the target obstacle point cloud; and tracking an obstacle corresponding to the target obstacle point cloud for route planning based on the direction information corresponding to the target obstacle point cloud, wherein the obstacle corresponds to a physical object within a distance from the vehicle, and
wherein the circumscribing rectangle of the target obstacle point cloud in the direction indicated by the each piece of candidate direction information is determined by: determining a plurality of circumscribing rectangles for the physical object each corresponding to the various vehicle sensors providing the three-dimensional point cloud data, and selecting a circumscribing rectangle of the plurality of circumscribing rectangles with the smallest width-to-length ratio, and wherein tracking the obstacle is further based on the selected circumscribing rectangle.

* * * * *